US012756782B2

(12) United States Patent
Agrawal et al.

(10) Patent No.: US 12,756,782 B2
(45) Date of Patent: *Oct. 6, 2026

(54) CONNECTED DEVICES CALL EXIT MANAGEMENT

(71) Applicant: Motorola Mobility LLC, Chicago, IL (US)

(72) Inventors: Amit Kumar Agrawal, Bangalore (IN); Himanshu Chug, Bangalore (IN); Satyabrata Rout, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 231 days.

This patent is subject to a terminal disclaimer.

(21) Appl. No.: 18/448,358

(22) Filed: Aug. 11, 2023

(65) Prior Publication Data

US 2025/0055941 A1 Feb. 13, 2025

(51) Int. Cl.
*H04M 3/56* (2006.01)
*H04W 4/16* (2009.01)

(52) U.S. Cl.
CPC ............ *H04M 3/568* (2013.01); *H04W 4/16* (2013.01)

(58) Field of Classification Search
CPC ............ H04M 3/00; H04M 3/40; H04M 3/42; H04M 3/42017; H04M 3/42221; H04M 3/42391; H04M 3/428; H04M 3/4281; H04M 3/4285; H04M 3/487; H04M 3/56; H04M 3/567; H04M 3/568; H04M 3/569; H04M 2203/00; H04M 2203/10; H04M 2203/252; H04M 2203/254; H04M 2250/22; H04M 2250/74; H04M 1/72469; H04M 2201/39; H04M 2201/40; H04M 2201/405; H04M 2201/41; H04M 2201/42; H04M 2201/50; H04M 2242/08;
(Continued)

(56) References Cited

U.S. PATENT DOCUMENTS

| | | | | |
|---|---|---|---|---|
| 7,203,648 | B1 | 4/2007 | Ostermann et al. | |
| 8,363,804 | B1 | 1/2013 | Adams | |
| 9,072,478 | B1 * | 7/2015 | Feerst | G06F 3/167 |

(Continued)

OTHER PUBLICATIONS

"VOICEMOD", Voicemod S.L [retrieved Jun. 27, 2023]. Retrieved from the Internet <https://www.voicemod.net/developers/>., 7 Pages.

(Continued)

*Primary Examiner* — Yuwen Pan
*Assistant Examiner* — Samuel H. Leonard
(74) *Attorney, Agent, or Firm* — FIG. 1 Patents

(57) ABSTRACT

In aspects of call exit management between connected devices, a mobile wireless device detects, via a computing device communicatively linked to a mobile wireless device, that a user desires to exit a conference call session on the computing device; displays, on a display device of the computing device, a prompt including at least one contextual transcript; sends, to the mobile wireless device and based on input relative to the prompt, a selected contextual transcript from the at least one contextual transcript, the mobile wireless device generating a cloned audio message from the selected contextual transcript; and sends the cloned audio message to an external speaker that emits the cloned audio message.

20 Claims, 6 Drawing Sheets

(58) Field of Classification Search
CPC ......... H04W 4/00; H04W 4/16; H04W 88/00; H04W 88/02; H04W 88/18; H04W 88/184
See application file for complete search history.

(56) References Cited

U.S. PATENT DOCUMENTS

| | | | | |
|---|---|---|---|---|
| 9,325,939 | B2 | 4/2016 | Schultz et al. | |
| 9,860,200 | B1 * | 1/2018 | Braun | H04L 51/046 |
| 10,536,288 | B1 * | 1/2020 | Leblang | H04W 4/16 |
| 10,574,822 | B1 * | 2/2020 | Sheshaiahgari | G06F 3/167 |
| 11,930,052 | B1 | 3/2024 | Rensburg | |
| 12,587,576 | B2 * | 3/2026 | Agrawal | H04L 65/1093 |
| 2002/0123331 | A1 * | 9/2002 | Lehaff | H04M 3/56 455/414.1 |
| 2004/0138879 | A1 | 7/2004 | Kim | |
| 2005/0208931 | A1 | 9/2005 | Hoffman | |
| 2009/0220066 | A1 | 9/2009 | Shaffer et al. | |
| 2012/0203538 | A1 | 8/2012 | Tamosevicius et al. | |
| 2014/0369483 | A1 * | 12/2014 | Lovitt | H04W 4/80 379/202.01 |
| 2017/0352361 | A1 | 12/2017 | Thorn | |
| 2018/0129295 | A1 * | 5/2018 | Episkopos | G06F 3/017 |
| 2018/0338040 | A1 * | 11/2018 | Carty | G06F 40/205 |
| 2018/0373488 | A1 * | 12/2018 | Chisu | H04N 21/8106 |
| 2019/0057698 | A1 * | 2/2019 | Raanani | H04M 3/22 |
| 2019/0287513 | A1 * | 9/2019 | Alameh | G10L 17/00 |
| 2022/0189474 | A1 * | 6/2022 | Sharifi | G06F 3/0488 |
| 2022/0374136 | A1 * | 11/2022 | Chang | G06F 3/04845 |
| 2022/0374190 | A1 * | 11/2022 | Rothera | H04M 7/0027 |
| 2023/0216990 | A1 * | 7/2023 | Fang | H04N 21/42203 348/14.09 |
| 2023/0259719 | A1 * | 8/2023 | Barry | G06F 40/58 704/2 |
| 2023/0267422 | A1 * | 8/2023 | Herman | G06F 3/013 705/7.18 |
| 2023/0289130 | A1 | 9/2023 | Dhoot et al. | |
| 2023/0308538 | A1 * | 9/2023 | Caro | G06F 3/048 |
| 2023/0359315 | A1 * | 11/2023 | Karunamuni | H04M 1/72469 |
| 2024/0029725 | A1 * | 1/2024 | Fryer-Mcculloch | A63F 13/87 |
| 2024/0179194 | A1 | 5/2024 | Jaiswal et al. | |
| 2024/0340321 | A1 | 10/2024 | Srinivasaraghavan et al. | |
| 2025/0046331 | A1 | 2/2025 | Hans | |
| 2025/0055888 | A1 | 2/2025 | Agrawal et al. | |
| 2025/0078841 | A1 * | 3/2025 | Wu | G10L 17/04 |
| 2025/0255678 | A1 * | 8/2025 | Roh | G10L 15/22 |

OTHER PUBLICATIONS

1 "Non-Final Office Action", U.S. Appl. No. 18/448,336, filed May 16, 2025, 12 pages.
"Final Office Action", U.S. Appl. No. 18/448,336, filed Oct. 2, 2025, 14 pages.
Corrected Notice of Allowability issued in U.S. Appl. No. 18/448,336, mailed Feb. 2, 2026, 2 pages.
Notice of Allowance issued in U.S. Appl. No. 18/448,336, mailed Jan. 22, 2026, 7 pages.

* cited by examiner

CONNECTED DEVICES CALL EXIT MANAGEMENT

BACKGROUND

The video conferencing market is a growing market accelerated largely due to the global pandemic. The growth of video conferencing in general is occurring due to the increase in the proliferation of mobile devices. Mobile devices enable participants to join a video conference from almost anywhere in the world. However, sometimes a conference call may run longer than needed for the purpose of the call. At times, a point in the conversation may be reached when everyone on the call knows it is time to wrap up the call, but for one or more reasons, the discussion keeps going. In some cases, one or more participants on the call may show no signs of slowing down while one or more other participants grow weary of the conversation. Currently, communication applications do not provide a way for participants to exit a call gracefully in such situations.

BRIEF DESCRIPTION OF THE DRAWINGS

Implementations of the techniques for call exit management between connected devices are described with reference to the following Figures. The same numbers may be used throughout to reference like features and components shown in the Figures.

DETAILED DESCRIPTION

Figure 1:
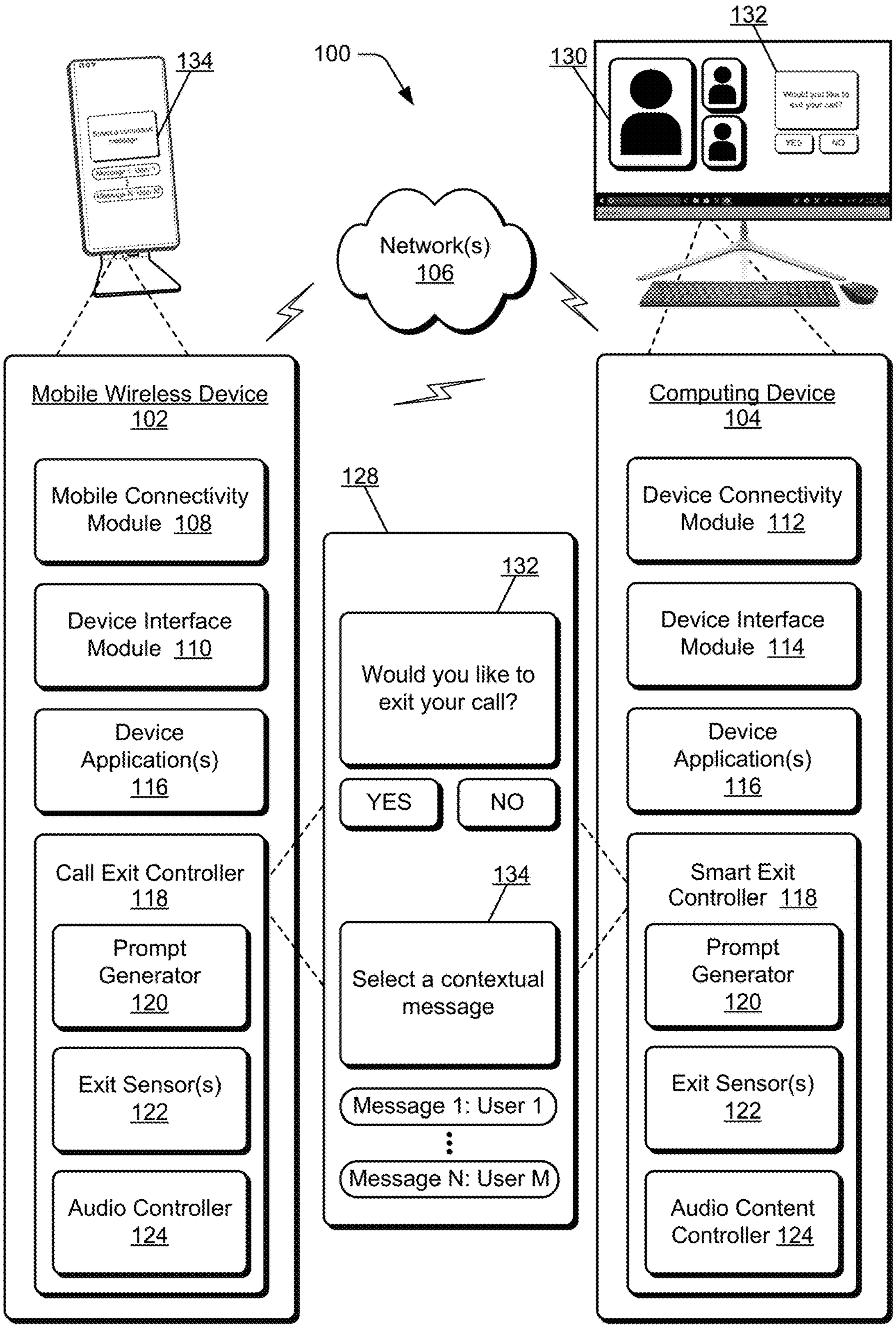
FIG. 1 illustrates an example system for call exit management between connected devices in accordance with one or more implementations as described herein.

Implementations of techniques for call exit management between connected devices may be implemented as described herein. Connected devices, such as a mobile wireless device (e.g., any type of mobile phone or other wireless device), a computing device, a wired speaker, and/or a wireless speaker, may be communicatively linked (e.g., a communication link including at least one of a wired connection, wireless connection, short-range wireless connection, near-field wireless connection, etc.) to share smart call exit functionality between the connected devices. In some cases, at least one of the connected devices implements an instantiation of a call exit controller, enabling users to exit conference calls gracefully.

Generally, a user of the connected devices, such as the mobile wireless device communicatively linked with the computing device, may utilize at least one of the connected devices to participate in a conference call. At some point, the user may determine that the conference call has served its purpose or the user simply desires to exit the call. However, the conversation may continue beyond this point because the participants do not want to appear rude for ending the call, or one participant on the call may be going strong while another is growing weary of the conversation. The smart call exit functionality techniques for call exit management between connected devices remedies these situations.

In aspects of the described techniques, a call exit controller provides smart call exit functionality to enable users to exit conference calls gracefully. In some examples, the smart call exit functionality is shared between connected devices, which may include a mobile wireless device communicatively linked to a computing device, and at least one of the connected devices implements an instantiation of a call exit controller. Audio content may be captured by either of the mobile wireless device or the computing device, and the connected devices may utilize a communication link between each respective connected device to share the captured audio content and/or information regarding the captured audio content (e.g., metadata) between the connected devices.

In implementations, the call exit controller may determine that a conference call is initiated on a connected device or any time during the call determine that a user is engaging in the conference call on a connected device. In some cases, the call exit controller may determine that the length of a conference call has exceeded a threshold time period. The conference call may include an audio-only call, an audio with video call, and/or a mix of audio-only and audio with video. In some cases, the call exit controller may determine that the user is engaged in the conference call and that the conference call satisfies a threshold number of participants (e.g., two or more participants, etc.). In implementations, the call exit controller may implement smart call exit functionality techniques based on the determination that the user is engaged in the conference call. In some cases, the call exit controller may implement smart call exit functionality techniques based on the determination that the conference call satisfies a threshold number of participants.

While features and concepts of the described techniques for call exit management between connected devices may be implemented in any number of different devices, systems, environments, and/or configurations, implementations of the techniques for call exit management between connected devices are described in the context of the following example devices, systems, and methods.

FIG. 1 illustrates an example system 100 for call exit management between connected devices, as described herein. The system 100 includes a mobile wireless device 102, such as a smartphone, mobile phone, or any other type of wireless device. The mobile wireless device 102 can be implemented with various components, such as a processor system and memory, as well as any number and combination of different components as further described with reference to the example device shown in FIG. 6. In implementations, the mobile wireless device 102 includes various radios for wireless communication with other devices. For example, the mobile wireless device 102 can include a BLUETOOTH® (BT) and/or BLUETOOTH® Low Energy (BLE) transceiver and/or a near field communication (NFC) transceiver. The mobile wireless device 102 can also include a WI-FI® radio, a global positioning satellite (GPS) radio, and/or any available type of device communication interface.

The system 100 also includes a computing device 104, such as any type of computer, laptop device, desktop computer, tablet, wireless device, smart device, media device, display device, smart TV, or any other type of presentation device. Similar to the mobile wireless device 102, the computing device 104 can be implemented with various components, such as a processor system and memory, as well as any number and combination of the different components as further described with reference to the example device shown in FIG. 6. In implementations, the mobile wireless device 102 can be communicatively linked, by a wired and/or wireless connection, to the computing device 104 on which a user interface, prompts, notifications, etc., can be displayed. In some cases, a notification generated by the mobile wireless device 102 can be displayed on the mobile wireless device 102 and/or transmitted to and displayed on the computing device 104. The mobile wireless device 102 and the computing device 104 are interconnected in various ways to enable content from the mobile wireless device to be displayed or otherwise presented by the computing device 104, and/or to enable content from the computing device 104 to be displayed or otherwise presented by the mobile wireless device 102. For example, the mobile wireless device 102 and the computing device 104 are interconnected via a communication network 106 and/or via direct inter-device connectivity, e.g., via direct wireless and/or wired connectivity between the mobile wireless device 102 and the computing device 104.

Any of the devices, applications, modules, servers, and/or services described herein may communicate via the communication network 106, such as for data communication between the mobile wireless device 102 and the computing device 104. The communication network 106 can include a wired and/or a wireless network. The communication network 106 can be implemented using any type of network topology and/or communication protocol, and can be represented or otherwise implemented as a combination of two or more networks, to include IP-based networks, cellular networks, and/or the Internet. The communication network 106 can include mobile operator networks that are managed by a mobile network operator and/or other network operators, such as a communication service provider, mobile phone provider, and/or Internet service provider.

The mobile wireless device 102 includes various functionality that enables the mobile wireless device 102 to implement different aspects of call exit management between connected devices, as described herein. In this example, the mobile device 102 includes a mobile connectivity module 108 and a device interface module 110. The mobile connectivity module 108 represents functionality (e.g., logic and/or hardware) enabling the mobile wireless device 102 to interconnect with other devices and/or networks, such as the computing device 104 and the communication network 106. For example, the mobile connectivity module 108 enables wireless and/or wired connectivity of the mobile wireless device 102. The device interface module 110 represents functionality enabling the mobile wireless device 102 to interface with other devices. As further detailed below, the device interface module 110 enables the mobile wireless device 102 to establish wireless and/or wired data communication with other devices, such as the computing device 104 or similar presentation devices. The mobile connectivity module 108 and the device interface module 110 can be implemented as computer instructions stored on computer-readable storage media and can be executed by a processor system of the device. Alternatively, or in addition, the mobile connectivity module 108 and the device interface module 110 can be implemented at least partially in hardware of the mobile wireless device 102.

Similarly, the computing device 104 includes various functionality that enables the computing device to implement different aspects of call exit management between connected devices, as described herein. In this example, the computing device 104 includes a device connectivity module 112 and a device interface module 114. The device connectivity module 112 represents functionality (e.g., logic and/or hardware) enabling the computing device 104 to interconnect with other devices and/or networks, such as the mobile wireless device 102 and the communication network 106. For example, the device connectivity module 112 enables wireless and/or wired connectivity of the computing device 104. The device interface module 114 represents functionality enabling the computing device 104 to interface with other devices. As further detailed below, the device interface module 114 enables the computing device 104 to establish wireless and/or wired data communication with other devices, such as the mobile wireless device 102 or similar devices. The device connectivity module 112 and the device interface module 114 can be implemented as computer instructions stored on computer-readable storage media and can be executed by a processor system of the respective device. Alternatively, or in addition, the device connectivity module 112 and the device interface module 114 can be implemented at least partially in hardware of the respective device.

A connectivity session may be established between the mobile wireless device 102 and the computing device 104 that enables the mobile wireless device 102 to send output content to and/or receive output content from the computing device 104. In one or more implementations, the connectivity session is established via intercommunication between the device interface module 110 of the mobile wireless device 102 and the device interface module 114 of the computing device 104. The output content can be any type of digital video, images, audio, application interfaces, etc. In one or more implementations, the computing device 104 can output the output content at the device.

The mobile wireless device 102 can communicate any of various types of content to the computing device 104, and vice-versa. In implementations, the mobile wireless device 102 outputs to the computing device 104 content that is being displayed on a display of the mobile wireless device 102 (e.g., also referred to as a mirror mode). In this example, the computing device 104 displays the same content as the mobile wireless device 102, but as a larger size display on the computing device. Alternatively, or in addition, the mobile wireless device 102 can output to the computing device 104 content from an application program or operating system without displaying the content on the display of the mobile wireless device. For example, a media application can receive media content (e.g., photograph, movie) from a remote server via the communication network 106 and provide that media content to the computing device 104 for display, without displaying or otherwise presenting the content at the mobile wireless device.

The mobile wireless device 102 and/or the computing device 104 can include and implement device applications 116, such as any type of messaging application, email application, video communication application, cellular communication application, music/audio application, gaming application, media application, social platform applications, and/or any other of the many possible types of device applications. Many of the device applications 116 have an associated application user interface that is generated and displayed for user interaction and viewing, such as on a display screen of the mobile wireless device 102 and/or on a display of the computing device 104. Generally, an application user interface, or any other type of video, image, graphic, and the like is digital image content that is displayable on the display screen of the mobile wireless device 102 and/or on the display of the computing device 104.

In the example system 100 for call exit management between connected devices, the mobile wireless device 102 and the computing device 104 are connected devices that share smart call exit functionality between the devices. Each of the connected devices implements an instantiation of a call exit controller 118 (e.g., as a device application 116). The call exit controller 118 represents functionality (e.g., logic, software, and/or hardware) enabling implementation of described techniques for call exit management between connected devices. The call exit controller 118 can be implemented as computer instructions stored on computer-readable storage media and can be executed by a processor system of the mobile wireless device 102 and/or of the computing device 104. Alternatively, or in addition, the call exit controller 118 can be implemented at least partially in hardware of a device.

In one or more implementations, the call exit controller 118 can include independent processing, memory, and/or logic components functioning as a computing and/or electronic device integrated with the mobile wireless device 102 and/or with the computing device 104. Alternatively, or in addition, the call exit controller 118 can be implemented in software, in hardware, or as a combination of software and hardware components. In this example, the call exit controller 118 is implemented as a software application or module, such as executable software instructions (e.g., computer-executable instructions) that are executable with a processor system of the mobile wireless device 102 and/or the computing device 104 to implement the techniques and features described herein. As a software application or module, the call exit controller 118 can be stored on computer-readable storage memory (e.g., memory of a device), or in any other suitable memory device or electronic data storage implemented with the module. Alternatively, or in addition, the call exit controller 118 can be implemented in firmware and/or at least partially in computer hardware. For example, at least part of the call exit controller 118 can be executable by a computer processor, and/or at least part of the content manager can be implemented in logic circuitry.

As shown, the example call exit controller 118 can include a prompt generator 120, one or more exit sensors 122, and an audio controller 124. In the illustrated example, the call exit controller 118 determines that a conference call 130 is initiated on a connected device (e.g., initiated on the mobile wireless device 102 or initiated on the computing device 104). In some cases, the call exit controller 118 can determine at any time during a call that a conference call 130 is in progress on a connected device. In some cases, the call exit controller 118 can determine that the length of a conference call 130 has exceeded a threshold time period. The conference call 130 can include an audio-only call, an audio with video call, and/or a mix of audio-only and audio with video. In some cases, the call exit controller 118 determines that the user is engaged in the conference call 130 and that the conference call 130 satisfies a threshold number of participants (e.g., 2 or more participants, etc.). In implementations, the call exit controller 118 may implement smart call exit functionality techniques based on the determination that the user is engaged in the conference call 130. In some cases, the call exit controller 118 may implement smart call exit functionality techniques based on the determination that the conference call 130 satisfies a threshold number of participants.

In the illustrated example, the call exit controller 118 may determine that a user wants to exit the call, but wants to do so gracefully and politely without coming across as rude. In some cases, the call exit controller 118 may determine (e.g., via the one or more exit sensors 122) that the user wants to exit the call based on visual cues (e.g., gestures of the user), conversational cues (e.g., words or phrases spoken by the user), and/or textual cues (e.g., words or phrases written or texted by the user) that are detected by the one or more exit sensors 122. In some examples, a user may be a participant of a conference call 130 on the computing device 104. In some cases, the call exit controller 118 can detect that the user sends a text message on the mobile wireless device 102 indicating the user would like to exit the call. Accordingly, the call exit controller 118 can implement the smart call exit functionality techniques.

In some examples, the call exit controller 118 includes a user interface. In some cases, the call exit controller 118 can determine that the user wants to exit the call based on the user actuating a button of the user interface provided by the prompt generator 120. As shown, the prompt generator 120 can generate one or more prompts. Example prompts 128 generated by the prompt generator 120 can include a confirmation prompt 132 to confirm that the user wants to exit the call and a contextual message prompt 134 to enable the user select a contextual message to play on a speaker. In some cases, the contextual message prompt 134 can indicate text or a phrase that the audio controller 124 can convert to speech (e.g., via a text-to-speech function of the audio controller 124) that is emitted on a speaker.

When the call exit controller 118 determines the user wishes to drop the call gracefully, the call exit controller 118 can determine whether a video feed of the call is active (e.g., whether video of the user is on or off during the call or at the time the determination is made). When the video feed is active, the conference call 130 can include video images of the user being captured on a connected device and shared with other participants during the call, in addition to audio from the user and the other participants.

In the illustrated example, the call exit controller 118 can provide the user with the contextual message prompt 134 to be played out loud via a speaker. In some cases, the prompt generator 120 of the call exit controller 118 can provide the user with a list of contextual messages enabling the user to choose which contextual message to play on a speaker. In some examples, the contextual messages indicate phrases someone other than the user would say to the user (e.g., something a family member, friend, or roommate of the user would say) while the user is on the conference call 130 (e.g., a message related to a task, responsibility, or errand to be done by the user or associated with the user).

In some examples, the audio controller 124 can record the user reading one or more contextual transcripts out loud. In some examples, the audio controller 124 can record the user's family, friends, roommates, etc., reading one or more contextual transcripts out loud. In some cases, the audio controller 124 can learn the voice of the user, the user's family, friends, roommates, etc., based on the recordings and machine learning. Accordingly, the audio controller 124 can learn to clone the voice of the user, the user's family, friends, roommates, etc. In some cases, the call exit controller 118 is programmed to use the user's name and/or names from the user's family, friends, roommates, etc., in the contextual transcript (e.g., "Amit, it is time to take Naitik to his practice."). Accordingly, the call exit controller 118 can customize and individualize the contextual transcript based on details unique to a particular user.

In the illustrated example, the audio controller 124 converts the text of a contextual message to speech and apply a cloned voice to the text-to-speech audio. Additionally, or alternatively, the audio controller 124 can apply an audio depth effect to the text-to-speech audio or to the cloned text-to-speech audio. The audio controller 124 (e.g., in conjunction with the mobile wireless device 102) can play the modified text-to-speech audio on a speaker of the mobile wireless device 102 or cast the modified text-to-speech audio to a speaker that is external to the mobile wireless device 102 and the computing device 104 (e.g., a wireless speaker communicatively linked to the mobile wireless device 102 and/or the computing device 104).

In the illustrated example, the audio controller 124 allows the user to choose among a list of cloned voices (e.g., clone of spouse's voice, clone of roommate's voice, clone of friend's voice, clone of parent's voice, clone of child's voice, etc.). The audio controller 124 can display the cloned voice message options on the computing device 104 and/or the connected mobile wireless device 102.

In the illustrated example, the call exit controller 118 determines whether the user is sharing his or her screen during the call (e.g., screen of the computing device 104 where the call is taking place). When the call exit controller 118 determines that the user is sharing his or her screen, the call exit controller 118 can block prompts (e.g., from the prompt generator 120) and other user interface elements of the call exit controller 118 from appearing on the screen of the computing device 104. Instead, the call exit controller 118 can route prompts (e.g., from the prompt generator 120) and other user interface elements of the call exit controller 118 to a screen of the connected mobile wireless device 102.

In the illustrated example, the audio controller 124 plays the cloned audio message on a speaker external to the computing device 104 on which the call is taking place (e.g., on a speaker of a connected mobile wireless device 102, on a speaker external to the computing device 104 and the connected mobile wireless device 102). When the video feed of the user is active, the prompt generator 120 can prompt the user to turn his or her head in a certain direction (e.g., look left, look right, turn your head left, turn your head right, etc.) in correlation to the cloned audio message being played out loud on the speaker. Accordingly, based on the user's video feed being active, the other participants on the call can see the user turn his or her head while also hearing the cloned audio message played out loud on the speaker.

Figure 2A:
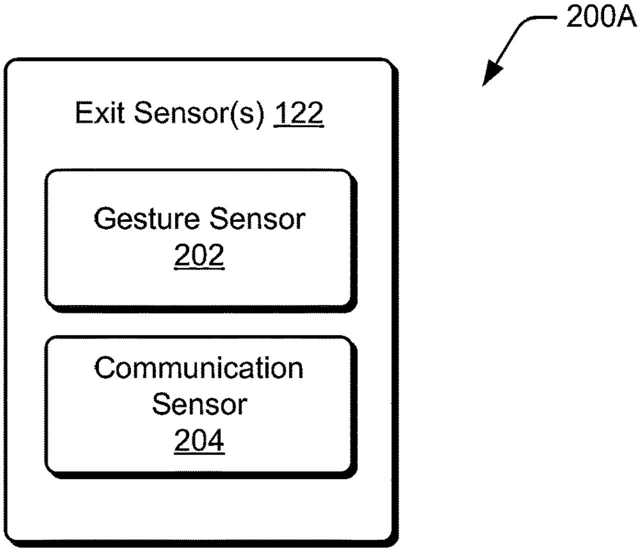
FIGS. 2A and 2B further illustrate examples of call exit management between connected devices in accordance with one or more implementations as described herein.
Figure 2B:
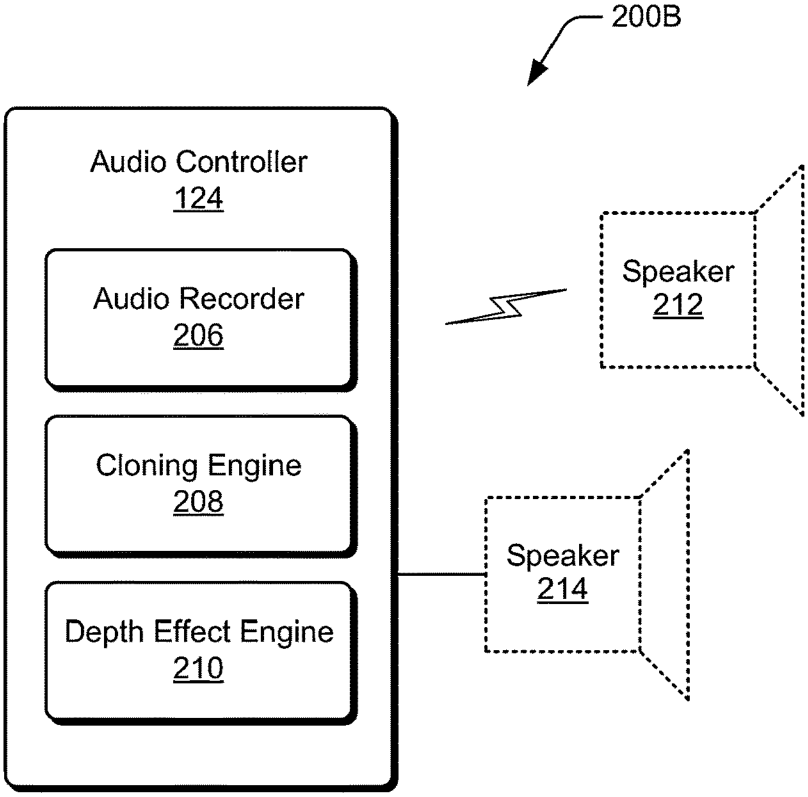

FIGS. 2A and 2B further illustrate examples 200A and 200B of call exit management between connected devices, as described herein. As shown, the one or more exit sensors 122 include a gesture sensor 202 and a communication sensor 204. In the examples, the one or more exit sensors 122 can enable smart call exit functionality associated with detecting indications that the user wishes to exit a call gracefully. In some examples, the one or more exit sensors 122 can detect indications that the user desires to exit a conference call (e.g., the conference call 130) based on visual cues (e.g., gestures of the user), conversational cues (e.g., words or phrases spoken by the user), and/or textual cues (e.g., words or phrases written or texted by the user) detected by the one or more exit sensors 122.

In the illustrated example, the gesture sensor 202 detects visual cues that the user desires to exit a conference call. In some examples, the gesture sensor 202 can detect the user checking the time (e.g., checking his or her watch or checking the time on his or her mobile wireless device 102). In some cases, the gesture sensor 202 can detect the user checking the time at least a threshold number of times within a given time period. In some examples, the gesture sensor 202 can detect the user sighing (e.g., sighing at least a threshold number of times within a given time period). In some examples, the gesture sensor 202 can detect a facial expression of the user that indicates the user wants to exit the call (e.g., indicates the user is bored or is becoming frustrated or impatient, etc.). In some examples, the gesture sensor 202 can detect that the user is disinterested in the call or is no longer interested in the call (e.g., detect that the user is distracted or no longer paying attention to the call, etc.). In some examples, the gesture sensor 202 can detect that the user is currently spending more time on his or her phone during the call (e.g., currently spending more time on phone than at another time during the call, or spending at least a threshold time period on his or her phone, etc.).

In the illustrated example, the communication sensor 204 detects conversational cues (e.g., words or phrases spoken by the user) and/or textual cues (e.g., words or phrases written or texted by the user) that indicate the user desires to exit the conference call. In some examples, the communication sensor 204 can determine that the user is disinterested in the call by detecting key phrases communicated by the user during the call. The communication sensor 204 can detect the user speaking and/or writing key phrases during the call (e.g., user speaks into a microphone of a connected device during the call, user enters text in a chat within the conference call application, user enters text in a texting app independent of the conference call application, etc.). The following are some examples of the key phrases that the communication sensor 204 can detect the user communicating during the call.

"I've got another call in a couple of minutes. I'll talk to you soon."

"My battery is getting low, so I'm going to hop off. Have an amazing day!"

"It sounds like we've covered everything we needed to, so I'll let you go. Thank you for such a productive meeting!"

"I can't believe it's already [time of day]. I'm sure you've got lots of things on your agenda, so I'll let you get to them. Let me know if there's anything else I can do for you."

"I really appreciate you taking the time to speak with me. Have a fantastic rest of your day, and I'll look for your [email/notes/report/follow-up]."

"Your ideas sound really promising; can't wait to see them in action. In the meantime, you've probably got a lot on your plate, so I'll let you get back to work."

"I want to get you the answers to your questions as soon as possible, so I'm going to get off now—look for my email by the end of the [day/week]."

"Wow, I can't believe it's already [time]. Do you mind if I hang up and finish up my to-do list?"

In the illustrated example, the audio controller 124 includes an audio recorder 206, a cloning engine 208, and a depth effect engine 210. As shown, the audio controller 124 can connect to a wireless speaker 212 or connect to a wired speaker 214. In some cases, the wired speaker 214 can be a speaker of a mobile wireless device (e.g., a speaker incorporated in the mobile wireless device 102). In some cases, the wireless speaker 212 can include a speaker wirelessly connected to one or more connected devices. In some cases, the audio controller 124 can transmit a modified audio message to the wireless speaker 212 or the wired speaker 214.

In some cases, the audio recorder 206 can prompt the user (e.g., via the prompt generator 120) to record the user and/or one or more associates of the user (e.g., family, friend, roommate, etc.) reading a contextual transcript out loud based on the call exit controller 118 to learn the voice of the user and/or the voice of the associates of the user. Accordingly, the audio recorder 206 can record the user and/or the associates of the user reading one or more contextual transcript out loud and generate cloned voice algorithms based on the recordings.

In the illustrated example, the call exit controller 118 can provide audio recording to the cloning engine 208. In some cases, the cloning engine 208 can analyze recordings and/or live captures of the voice of the user and/or the associates of the user. The cloning engine 208 can clone the voice of the user and/or the associates of the user based on the analysis. In some cases, the cloning engine 208 can apply learned voice cloning to a contextual message generated by the call exit controller 118. In some cases, the call exit controller 118 can generate the contextual message and indicate a cloned voice to apply to the contextual message. In some cases, the call exit controller 118 can select a contextual message and cloned voice based on the identity of the user. Accordingly, the cloning engine 208 can generate a cloned audio message based on the provided context transcript and the indicated cloned voice.

In some cases, the cloning engine 208 can apply learned voice cloning to a contextual message generated or written by the user. In some cases, the user can enter the text during the call and select a cloned voice to apply to the text. In some cases, the audio controller 124 can convert the text to speech and provide the converted speech audio to the cloning engine 208. The cloning engine 208 can then generate a cloned audio message based on the provided context transcript and the indicated cloned voice. In some examples, the depth effect engine 210 can apply an audio depth effect to the audio recording. The audio depth effect applied can be configured to make the audio recording sound as if it is coming from some distance away from the user or from another room when it is played on a speaker (e.g., the wireless speaker 212, the wired speaker 214).

In implementations, a call can be on a computing device 104 connected to the mobile wireless device 102 (e.g., connected devices). Based on the user indicating a desire to exit the call, the computing device 104 can confirm that the user wants to exit the call gracefully. The computing device 104 can prompt the user (e.g., via the prompt generator 120) to approve a contextual message delivered by an indicated cloned voice (e.g., Spouse: "Amit, Naitik has been waiting a long time. Can you please drop him off at badminton?" or Spouse: "Dinner is ready, and it is getting cold."). The user can accept the request and the cloning engine 208 (e.g., of the mobile wireless device 102) can then apply the indicated cloned voice to the approved contextual message. In some cases, the cloning engine 208 can apply a depth effect to the contextual message (e.g., to the cloned audio message). The audio controller 124 (e.g., of the mobile wireless device 102) can then play the modified cloned audio on a speaker of the mobile wireless device 102 (e.g., the wired speaker 214) or cast the modified cloned audio to a speaker that is external to the mobile wireless device 102 and the computing device 104 (e.g., the wireless speaker 212).

In some cases, the call exit controller 118 can provide a list of two or more contextual messages from which the user can choose which contextual message to clone. In some cases, the call exit controller 118 can allow the user to choose among a list of cloned voices (e.g., cloned voice of spouse, child, parent, friend, roommate, etc.) provided by the cloning engine 208. The call exit controller 118 can display the cloned audio message options on the computing device 104 and/or the connected mobile wireless device 102 (e.g., one or more contextual message options and/or one or more cloned voice options). The call exit controller 118 can provide the cloned voice selected by the user to the audio controller 124. Accordingly, the audio controller 124 can convert a contextual message to audio (e.g., text-to-speech audio) and the cloning engine 208 can apply the selected cloned voice to the converted audio message. In some cases, the depth effect engine 210 can apply the depth effect to the converted audio message (e.g., the converted audio message with cloned voice applied). The audio controller 124 can then output the cloned voice audio message to a speaker (e.g., the wireless speaker 212 or the wired speaker 214).

Example methods 300, 400, and 500 are described with reference to respective FIGS. 3, 4, and 5 in accordance with one or more implementations of call exit management between connected devices, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
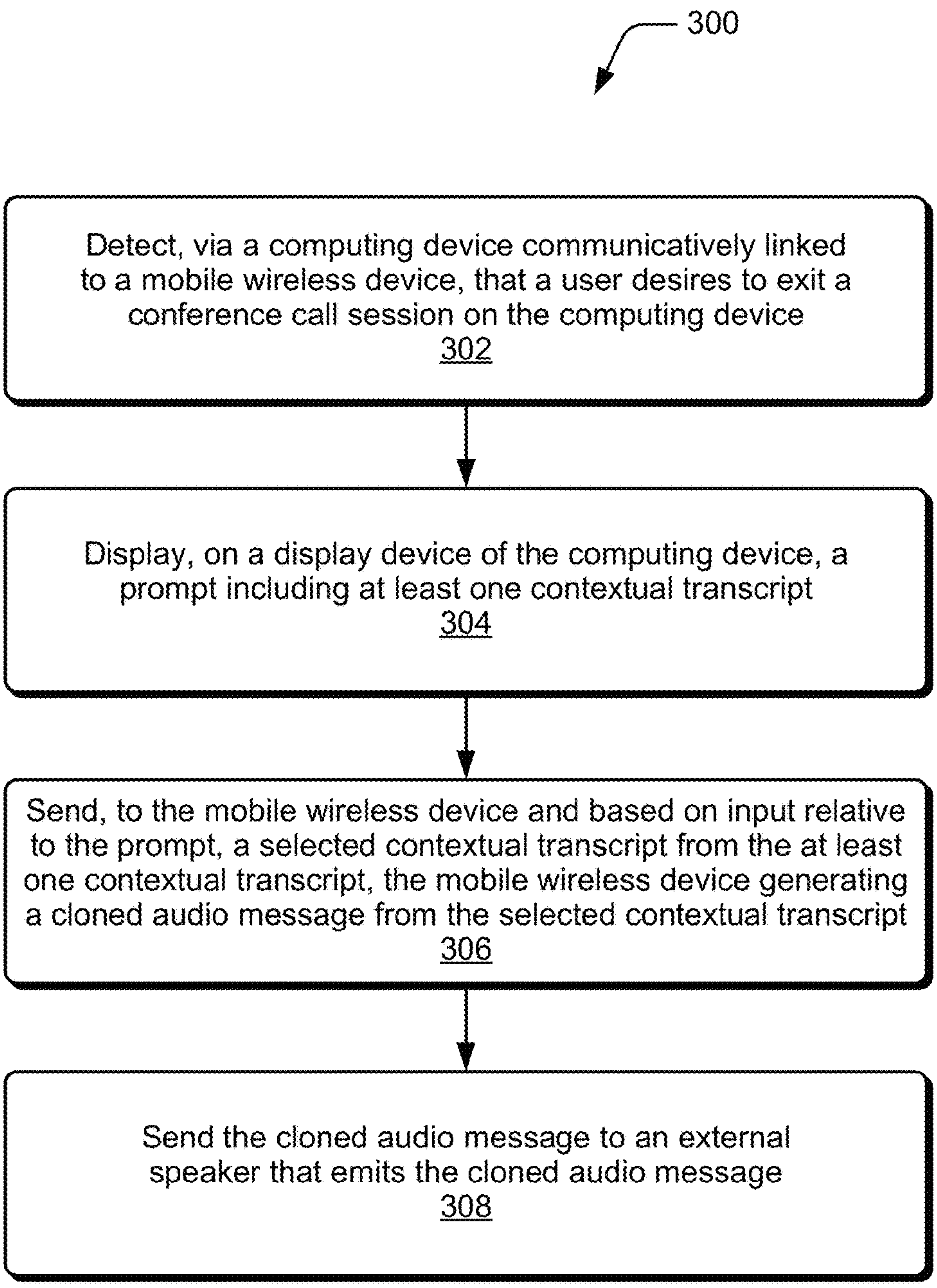
FIGS. 3-5 illustrate example methods for call exit management between connected devices in accordance with one or more implementations of the techniques described herein.

FIG. 3 illustrates example method(s) 300 for call exit management between connected devices. The order in which the method is described is not intended to be construed as a limitation, and any number or combination of the described method operations may be performed in any order to perform a method, or an alternate method.

At 302, the method 300 includes detecting, via a computing device communicatively linked to a mobile wireless device, that a user desires to exit a conference call session on the computing device.

At 304, the method 300 includes displaying, on a display device of the computing device, a prompt including at least one contextual transcript.

At 306, the method 300 includes sending, to the mobile wireless device and based on input relative to the prompt, a selected contextual transcript from the at least one contextual transcript, the mobile wireless device generating a cloned audio message from the selected contextual transcript.

At 308, the method 300 includes sending the cloned audio message to an external speaker that emits the cloned audio message.

Figure 4:
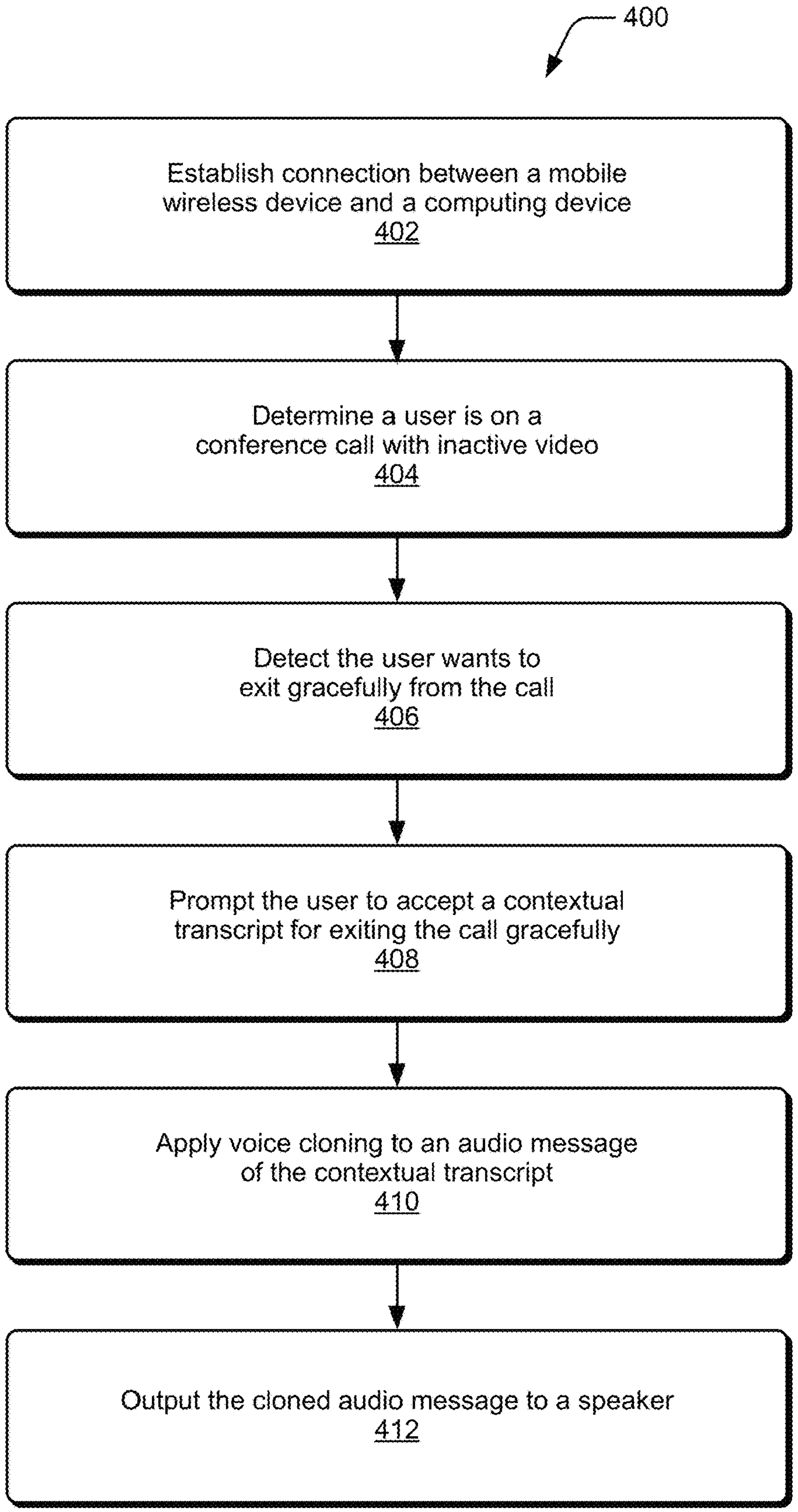

FIG. 4 illustrates example method(s) 400 for call exit management between connected devices. The order in which the method is described is not intended to be construed as a limitation, and any number or combination of the described method operations may be performed in any order to perform a method, or an alternate method.

At 402, the method 400 includes establishing a connection between a mobile wireless device and a computing device (e.g., a communication link between connected devices mobile wireless device 102 and computing device 104)

At 404, the method 400 includes determining a user is on a conference call with inactive video (e.g., video of the user is off during the conference call or at the time the determination is made). For example, the call exit controller 118 monitors one or more connected devices (e.g., the mobile wireless device 102, the computing device 104, etc.). Based on the monitoring, the call exit controller 118 determines the user is on a conference call with inactive video (e.g., on a call with audio and no video, an audio-only call). In example implementations, the call exit controller 118 determines that the user is on a call and determine that the user is on a conference call (e.g., determine a video feed option of the call is disabled or deactivated).

At 406, the method 400 includes detecting the user wants to exit gracefully from the call. For example, the call exit controller 118 detects (e.g., via the gesture sensor 202 and/or the communication sensor 204) that the user is exhibiting detectable signs (e.g., gestures, visual cues, conversational cues, textual cues, etc.) that indicate the user desires to exit the conference call.

In example implementations, the call exit controller 118 determines that the user wants to exit a call gracefully based on detected indications (e.g., detected gestures of the user, via detected communication of the user, etc.). In some cases, the call exit controller 118 displays a prompt to the user inquiring whether the user would like to exit the call gracefully (e.g., based on the detected indications). In some cases, the prompt inquiring whether the user would like to exit the call is triggered by the call exit controller 118 detecting one or more indications that the user would like to exit the call (e.g., via detected gestures, via detected communication, etc.). In some cases, detecting that the user wants to exit a call can include the call exit controller 118 determining, via a user interface incorporated in at least one of the computing device or the mobile wireless device (e.g., the prompt generator 120), a selection by the user that indicates the user desires the end the call. Based on a request from the user, the call exit controller 118 can determine whether the user is on a call (e.g., at 404). In response, the call exit controller 118 can provide a prompt with a contextual transcript (e.g., via the prompt generator 120).

At 408, the method 400 includes prompting the user to accept a contextual transcript for exiting the call gracefully. For example, the prompt generator 120 provides a prompt that requests the user accept the contextual transcript (e.g., based on an indicated cloned voice). Based on the user accepting the request, the call exit controller 118 executes the techniques for call exit management between connected devices.

At 410, the method 400 includes applying voice cloning to an audio message of the contextual transcript. In one or more examples, the audio controller 124 generates the audio message by recording the user speaking the contextual transcript during the conference call and applies a cloned voice to the audio message. Additionally or alternatively, the audio controller 124 converts the contextual transcript to an audio message and applies a cloned voice to the audio message. In some cases, the audio controller 124 applies a depth effect to the cloned audio message.

At 412, the method 400 includes outputting the cloned audio message to a speaker (e.g., the wireless speaker 212, the wired speaker 214).

Figure 5:
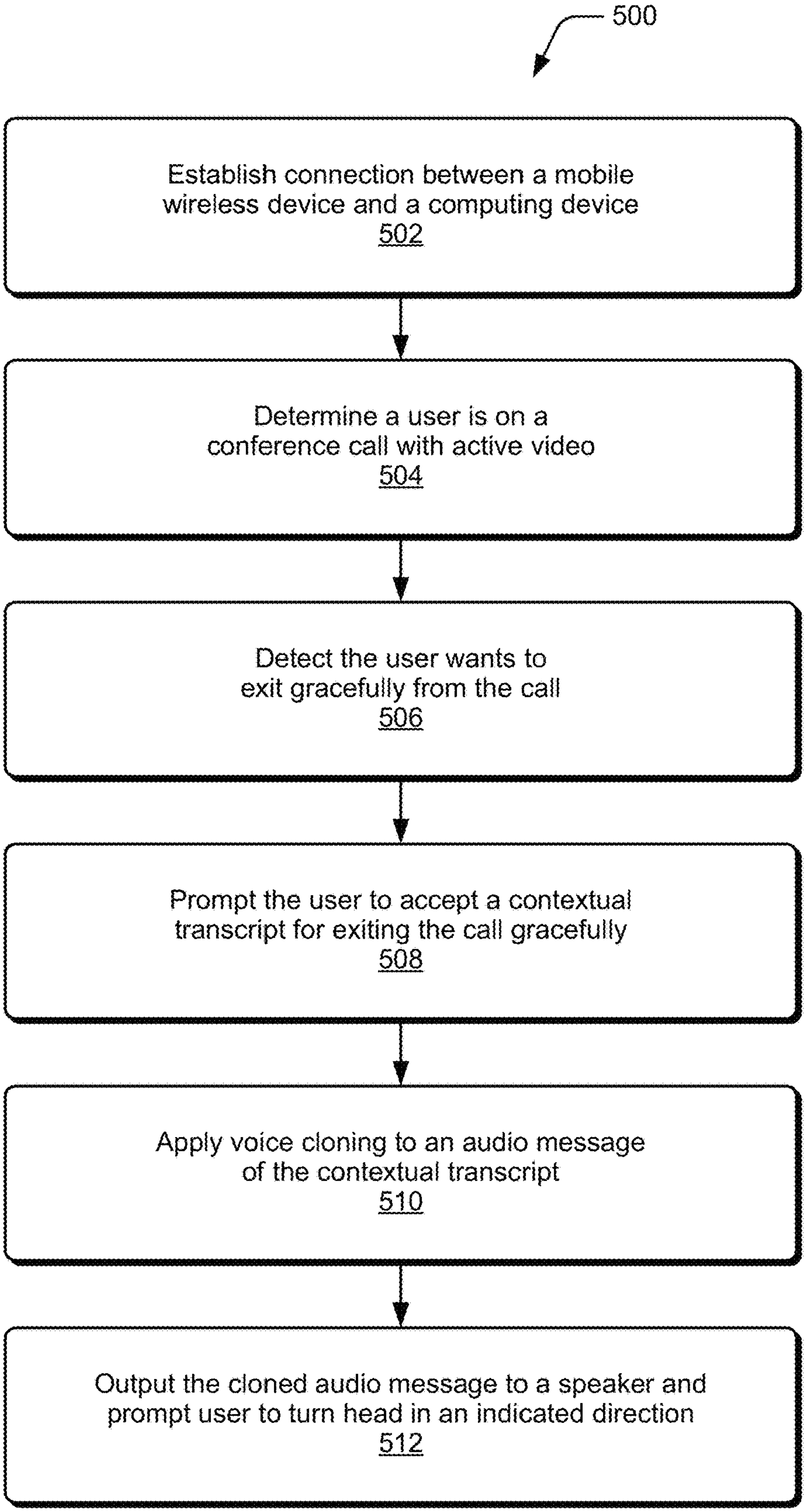

FIG. 5 illustrates example method(s) 500 for call exit management between connected devices. The order in which the method is described is not intended to be construed as a limitation, and any number or combination of the described method operations is performed in any order to perform a method, or an alternate method.

At 502, the method 500 includes establishing a connection between a mobile wireless device and a computing device (e.g., communication link between connected devices mobile wireless device 102 and computing device 104)

At 504, the method 500 includes determining a user is on a conference call with active video (e.g., video of the user is on during the conference call or at the time the determination is made). For example, the call exit controller 118 implemented on a first connected device (e.g., the mobile wireless device 102) determines that the user is on a conference call on a second connected device (e.g., the computing device 104). Based on the monitoring, the call exit controller 118 determines the user is on a conference call with active video (e.g., on a call with audio and video, a video call).

At 506, the method 500 includes detecting the user wants to exit gracefully from the call. For example, the call exit controller 118 detects (e.g., via the gesture sensor 202 and/or the communication sensor 204) that the user is exhibiting detectable signs (e.g., gestures, visual cues, conversational cues, textual cues, etc.) that indicate the user desires to exit the conference call.

In example implementations, the call exit controller 118 determines that the user wants to exit a call gracefully based on detected indications (e.g., detected gestures of the user, via detected communication of the user, etc.). In some cases, the call exit controller 118 prompts the user (e.g., via the prompt generator 120) with a request of whether the user desires to exit the call gracefully (e.g., confirm that the user desires to exit the call based on the gesture sensor 202 detecting gestures of the user that suggest the user desires to exit the call). In some cases, detecting that the user wants to exit a call includes the call exit controller 118 determining, via a user interface of at least one of the computing device 104 or the mobile wireless device 102 (e.g., the prompt generator 120), a selection by the user that indicates the user desires the end the call.

At 508, the method 500 includes prompting the user to accept a contextual transcript for exiting the call gracefully. For example, the prompt generator 120 provides a prompt that requests the user accept the contextual transcript (e.g., based on an indicated cloned voice). Based on the user accepting the request, the call exit controller 118 executes the techniques for call exit management between connected devices.

At 510, the method 500 includes applying voice cloning to an audio message of the contextual transcript. In one or more examples, the audio controller 124 applies a cloned voice to a pre-recorded audio message of the contextual transcript and applies a cloned voice to the pre-recorded audio message. Additionally or alternatively, the audio controller 124 converts the contextual transcript to an audio message and applies a cloned voice to the audio message. In some cases, the audio controller 124 applies a depth effect to the cloned audio message.

At 512, the method 500 includes outputting the cloned audio message to a speaker (e.g., the wireless speaker 212, the wired speaker 214) and prompting the user to look in an indicated direction (e.g., look left, look right, etc.).

In example implementations, the prompt generator 120 prompts the user to look in an indicated direction (e.g., look left, look right, turn head to the left, turn head to the right, etc.) in relation to the cloned voice audio message being played on the speaker. In some cases, the prompt is displayed in relation to (e.g., before, after, as) the cloned voice audio message being played on the speaker (e.g., within 1 second of the cloned voice audio message being played on the speaker).

Figure 6:
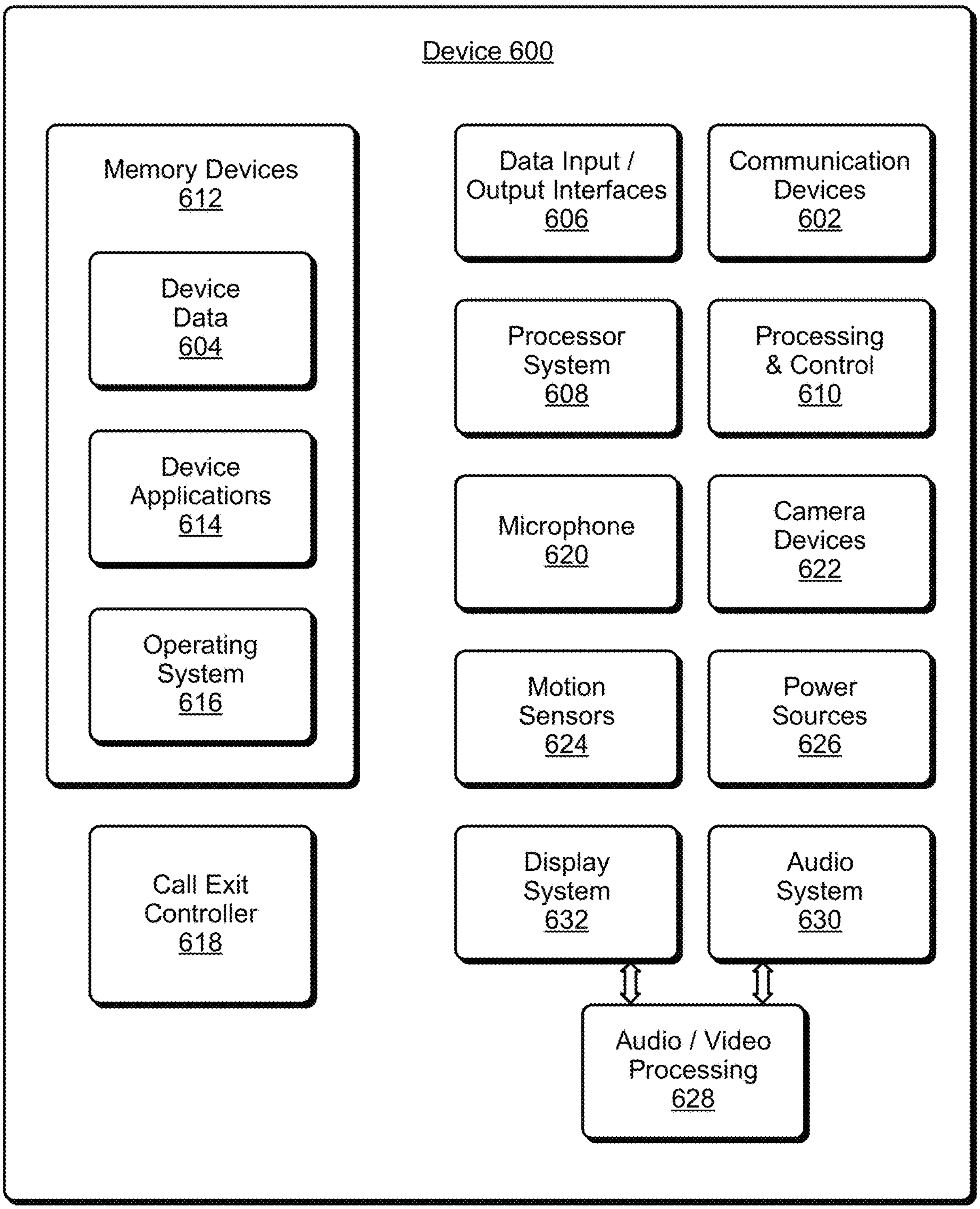
FIG. 6 illustrates various components of an example device that may be used to implement the techniques for call exit management between connected devices as described herein.

FIG. 6 illustrates various components of an example device 600, which can implement aspects of the techniques and features for call exit management between connected devices, as described herein. The example device 600 may be implemented as any of the devices described with reference to the previous FIGS. 1-5, such as any type of wireless device, mobile device, mobile phone, flip phone, client device, companion device, paired device, display device, tablet, computing, communication, entertainment, gaming, media playback, and/or any other type of computing and/or electronic device. For example, the mobile wireless device 102 and/or the computing device 104 described with reference to FIGS. 1-5 may be implemented as the example device 600.

The example device 600 can include various, different communication devices 602 that enable wired and/or wireless communication of device data 604 with other devices. The device data 604 can include data and content of any of the various devices that are generated, processed, determined, received, stored, and/or communicated from one computing device to another. Generally, the device data 604 can include any form of audio, video, image, graphics, and/or electronic data that is generated by applications executing on a device. The communication devices 602 can also include transceivers for cellular phone communication and/or for any type of network data communication.

The example device 600 can also include various, different types of data input/output (I/O) interfaces 606, such as data network interfaces that provide connection and/or communication links between the devices, data networks, and other devices. The I/O interfaces 606 can be used to couple the device to any type of components, peripherals, and/or accessory devices, such as a computer input device that can be integrated with the example device 600. The I/O interfaces 606 can also include data input ports via which any type of data, information, media content, communications, messages, and/or inputs can be received, such as user inputs to the device, as well as any type of audio, video, image, graphics, and/or electronic data received from any content and/or data source.

The example device 600 includes a processor system 608 of one or more processors (e.g., any of microprocessors, controllers, and the like) and/or a processor and memory system implemented as a system-on-chip (SoC) that processes computer-executable instructions. The processor system 608 can be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that can be implemented in connection with processing and control circuits, which are generally identified at 610. The example device 600 can also include any type of a system bus or other data and command transfer system that couples the various components within the device. A system bus can include any one or combination of different bus structures and architectures, as well as control and data lines.

The example device 600 also includes memory and/or memory devices 612 (e.g., computer-readable storage memory) that enable data storage, such as data storage devices implemented in hardware which can be accessed by a computing device, and that provide persistent storage of data and executable instructions (e.g., software applications, programs, functions, and the like). Examples of the memory devices 612 include volatile memory and non-volatile memory, fixed and removable media devices, and any suitable memory device or electronic data storage that maintains data for computing device access. The memory devices 612 can include various implementations of random-access memory (RAM), read-only memory (ROM), flash memory, and other types of storage media in various memory device configurations. The example device 600 can also include a mass storage media device.

The memory devices 612 (e.g., as computer-readable storage memory) provide data storage mechanisms, such as to store the device data 604, other types of information and/or electronic data, and various device applications 614 (e.g., software applications and/or modules). For example, an operating system 616 can be maintained as software instructions with a memory device 612 and executed by the processor system 608 as a software application. The device applications 614 can also include a device manager, such as any form of a control application, software application, signal-processing and control module, code that is specific to a particular device, a hardware abstraction layer for a particular device, and so on.

In this example, the device 600 includes a call exit controller 618 that implements various aspects of the described features and techniques described herein. The call exit controller 618 can be implemented with hardware components and/or in software as one of the device applications 614, such as when the example device 600 is implemented as the mobile wireless device 102 and/or the computing device 104 described with reference to FIGS. 1-5. An example of the call exit controller 618 is the call exit controller 118 implemented by each of the respective mobile wireless device 102 and the computing device 104, such as a software application and/or as hardware components in the wireless device and/or in the computing device. In implementations, the call exit controller 618 can include independent processing, memory, and logic components as a computing and/or electronic device integrated with the example device 600.

The example device 600 can also include a microphone 620 (e.g., to capture an audio recording of a user) and/or camera devices 622 (e.g., to capture video images of the user during a call), as well as motion sensors 624, such as can be implemented as components of an inertial measurement unit (IMU). The motion sensors 624 can be implemented with various sensors, such as a gyroscope, an accelerometer, and/or other types of motion sensors to sense motion of the device. The motion sensors 624 can generate sensor data vectors having three-dimensional parameters (e.g., rotational vectors in x, y, and z-axis coordinates) indicating location, position, acceleration, rotational speed, and/or orientation of the device. The example device 600 can also include one or more power sources 626, such as when the device is implemented as a wireless device and/or mobile device. The power sources can include a charging and/or power system, and can be implemented as a flexible strip battery, a rechargeable battery, a charged super-capacitor, and/or any other type of active or passive power source.

The example device 600 can also include an audio and/or video processing system 628 that generates audio data for an audio system 630 and/or generates display data for a display system 632. The audio system and/or the display system can include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 600. Alternatively, the audio system and/or the display system are external, peripheral components to the example device.

Although implementations for call exit management between connected devices have been described in language specific to features and/or methods, the appended claims are not necessarily limited to the specific features or methods described. Rather, the specific features and methods are disclosed as example implementations for call exit management between connected devices, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following.

A method, comprising: detecting, via a computing device communicatively linked to a mobile wireless device, that a user desires to exit a conference call session on the computing device; displaying, on a display device of the computing device, a prompt including at least one contextual transcript; sending, to the mobile wireless device and based on input relative to the prompt, a selected contextual transcript from the at least one contextual transcript, the mobile wireless device generating a cloned audio message from the selected contextual transcript; and sending the cloned audio message to an external speaker that emits the cloned audio message.

Alternatively, or in addition to the above-described method, any one or combination of: the detecting includes detecting a gesture of the user indicating the user desires to end the conference call session. The detecting includes detecting a comment communicated by the user during the conference call session that indicates the user desires to end the conference call session. The generating the cloned audio message includes generating an audio message based on the mobile wireless device applying text to speech to the selected contextual transcript. The generating the cloned audio message includes applying at least one of: a voice cloning to the audio message; or a depth effect to the audio message. Applying the voice cloning to the audio message includes selecting the voice cloning from a plurality of cloned voices based on at least one of a user identity, a time of day during the conference call session, or a location of the user during the conference call session. The method further comprising determining whether a video feed of the conference call session is active on the computing device, wherein the video feed includes a camera of the computing device capturing video images of the user. The method further comprising displaying, based on the video feed being active, a prompt on at least one of the mobile wireless device or the computing device instructing the user to look in an indicated direction.

A mobile wireless device, comprising: a communication interface to wirelessly link connected devices that include the mobile wireless device linked to a computing device; and a call exit controller configured to provide an exit option from a conference call; and the call exit controller implemented at least partially in computer hardware to: detect that a user desires to exit a conference call session on the computing device; initiate to display a prompt on a display device of the computing device, the prompt including at least one contextual transcript; generate, based on input relative to the prompt, a cloned audio message from a selected contextual transcript that is selected from the at least one contextual transcript based on input relative to the prompt; and send the cloned audio message to an external speaker that emits the cloned audio message.

Alternatively, or in addition to the above-described mobile wireless device, any one or combination of: the call exit controller is configured to detect a gesture of the user indicating the user desires to end the conference call session. The call exit controller is configured to detect a comment communicated by the user during the conference call session that indicates the user desires to end the conference call session. The call exit controller is configured to generate an audio message based on the mobile wireless device applying text to speech to the selected contextual transcript. In conjunction with the mobile wireless device generating the cloned audio message, the call exit controller is configured to apply at least one of: a voice cloning to the audio message; or a depth effect to the audio message. The call exit controller is configured to select the voice cloning from a plurality of cloned voices based on at least one of a user identity, a time of day during the conference call session, or a location of the user during the conference call session. The call exit controller is configured to determine whether a video feed of the conference call session is active on the computing device, wherein the video feed includes a camera of the computing device capturing video images of the user. The call exit controller is configured to display, based on the video feed being active, a prompt on at least one of the mobile wireless device or the computing device instructing the user to look in an indicated direction.

A system, comprising: connected devices that include at least a mobile wireless device communicatively linked to a computing device, at least one of the connected devices implementing an instantiation of a call exit controller to provide an exit from a conference call; the call exit controller implemented at least partially in computer hardware to detect that a user desires to exit a conference call session on the computing device; initiate to display a prompt on a display device of the computing device, the prompt including at least one contextual transcript; send, to the mobile wireless device and based on input relative to the prompt, a selected contextual transcript from the at least one contextual transcript, the mobile wireless device generating a cloned audio message from the selected contextual transcript; and send the cloned audio message to an external speaker that emits the cloned audio message.

Alternatively, or in addition to the above-described system, any one or combination of: the call exit controller is configured to detect a gesture of the user indicating the user desires to end the conference call session. The call exit controller is configured to detect a comment communicated by the user during the conference call session that indicates the user desires to end the conference call session. The call exit controller is configured to generate an audio message based on the mobile wireless device applying text to speech to the selected contextual transcript.

The invention claimed is:

1. A method, comprising:

detecting, via a mobile wireless device communicatively linked to a computing device, that a user desires to exit a conference call session between the computing device and a remote computing device;

determining that a video feed of the conference call session is active on the computing device;

causing to display on a display device of the mobile wireless device based on the video feed of the conference call session being active, a prompt including at least one contextual transcript;

sending, to the mobile wireless device and based on input relative to the prompt, a selected contextual transcript, the mobile wireless device generating a cloned audio message from the selected contextual transcript, the cloned audio message generated based on the mobile wireless device applying text to speech to the selected contextual transcript to generate the cloned audio message to sound like someone other than the user in proximity to the user; and sending the cloned audio message to an external speaker that emits the cloned audio message.

2. The method of claim 1, wherein the detecting includes detecting a gesture of the user indicating the user desires to exit the conference call session.

3. The method of claim 1, wherein the detecting includes detecting a comment communicated by the user during the conference call session that indicates the user desires to exit the conference call session.

4. The method of claim 1, wherein generating the cloned audio message includes applying at least one of:

a voice cloning to the cloned audio message; or a depth effect to the cloned audio message.

5. The method of claim 4, wherein applying the voice cloning to the cloned audio message includes selecting the voice cloning from a plurality of cloned voices based on at least one of a user identity, a time of day during the conference call session, or a location of the user during the conference call session.

6. The method of claim 1, wherein determining that the video feed of the conference call session is active on the computing device includes a camera of the computing device capturing video images of the user.

7. The method of claim 1, further comprising:

displaying, based on the video feed of the conference call session being active, the prompt on the mobile wireless device instructing the user to look in an indicated direction from which the external speaker emits the cloned audio message.

8. The method of claim 1, wherein the selected contextual transcript is associated with a time and a task relative to the user.

9. A mobile wireless device, comprising:

a communication interface to wirelessly link connected devices that include the mobile wireless device communicatively linked to a computing device; and a call exit controller configured to provide an exit option from a conference call session, the call exit controller implemented at least partially in computer hardware to:

detect that a user desires to exit the conference call session between the computing device and a remote computing device;

determine that a video feed of the conference call session is active on the computing device;

initiate to display a prompt on a display device of the mobile wireless device based on the video feed of the conference call session being active, the prompt including at least one contextual transcript;

generate, based on input relative to the prompt, a cloned audio message from a selected contextual transcript based on the input relative to the prompt, the cloned audio message generated based on applying text to speech to the selected contextual transcript to generate the cloned audio message to sound like someone other than the user in proximity to the user; and send the cloned audio message to an external speaker that emits the cloned audio message.

10. The mobile wireless device of claim 9, wherein the call exit controller is configured to detect a gesture of the user indicating the user desires to exit the conference call session.

11. The mobile wireless device of claim 9, wherein the call exit controller is configured to detect a comment communicated by the user during the conference call session that indicates the user desires to exit the conference call session.

12. The mobile wireless device of claim 9, wherein, in conjunction with the mobile wireless device generating the cloned audio message, the call exit controller is configured to apply at least one of:

a voice cloning to the cloned audio message; or a depth effect to the cloned audio message.

13. The mobile wireless device of claim 12, wherein the call exit controller is configured to select the voice cloning from a plurality of cloned voices based on at least one of a user identity, a time of day during the conference call session, or a location of the user during the conference call session.

14. The mobile wireless device of claim 9, wherein the video feed of the conference call session is active on the computing device includes a camera of the computing device capturing video images of the user.

15. The mobile wireless device of claim 9, wherein the call exit controller is configured to display, based on the video feed of the conference call session being active, the prompt on the mobile wireless device instructing the user to look in an indicated direction from which the external speaker emits the cloned audio message.

16. The mobile wireless device of claim 9, wherein the selected contextual transcript is associated with a time and a task relative to the user.

17. A system, comprising:

connected devices that include at least a mobile wireless device communicatively linked to a computing device, at least one of the connected devices implementing an instantiation of a call exit controller configured to provide an exit from a conference call session; and the call exit controller implemented at least partially in computer hardware to:

detect that a user desires to exit the conference call session between the computing device and a remote computing device;

determine that a video feed of the conference call session is active on the computing device;

initiate to display a prompt on a display device of the mobile wireless device based on the video feed of the conference call session being active, the prompt including at least one contextual transcript;

send, to the mobile wireless device and based on input relative to the prompt, a selected contextual transcript, the mobile wireless device generating a cloned audio message from the selected contextual transcript, the cloned audio message generated based on the mobile wireless device applying text to speech to the selected contextual transcript to generate the cloned audio message to sound like someone other than the user in proximity to the user; and send the cloned audio message to an external speaker that emits the cloned audio message.

18. The system of claim 17, wherein the call exit controller is configured to detect a gesture of the user indicating the user desires to exit the conference call session.

19. The system of claim 17, wherein the call exit controller is configured to detect a comment communicated by the user during the conference call session that indicates the user desires to exit the conference call session.

20. The system of claim 17, wherein the selected contextual transcript is associated with a time and a task relative to the user.

* * * * *